US009450482B2

(12) United States Patent
Drummond et al.

(10) Patent No.: US 9,450,482 B2
(45) Date of Patent: Sep. 20, 2016

(54) FAULT RECOVERY FOR MULTI-PHASE POWER CONVERTERS

(71) Applicants: Geoffrey N. Drummond, Fort Collins, CO (US); Vladislav V. Shilo, Fort Collins, CO (US)

(72) Inventors: Geoffrey N. Drummond, Fort Collins, CO (US); Vladislav V. Shilo, Fort Collins, CO (US)

(73) Assignee: COLORADO POWER ELECTRONICS, INC., Fort Collins, CO (US)

( * ) Notice: Subject to any disclaimer, the term of this patent is extended or adjusted under 35 U.S.C. 154(b) by 89 days.

(21) Appl. No.: 14/121,500

(22) Filed: Sep. 12, 2014

(65) Prior Publication Data

US 2016/0079846 A1    Mar. 17, 2016

(51) Int. Cl.
*H02M 1/32*    (2007.01)
*H02M 7/5387*    (2007.01)

(52) U.S. Cl.
CPC ........... *H02M 1/32* (2013.01); *H02M 7/53873* (2013.01); *H02M 2001/325* (2013.01)

(58) Field of Classification Search
CPC .......... H02M 1/32; H02M 1/34; H02M 1/36; H02M 1/38; H02M 3/33507; H02M 7/003; H02M 7/48; H02M 7/537; H02H 7/1227
USPC ....... 363/50, 55, 56.01, 56.02, 56.03, 56.04, 363/56.05, 95, 131
See application file for complete search history.

(56) References Cited

U.S. PATENT DOCUMENTS

| | | | |
|---|---|---|---|
| 4,150,425 A | 4/1979 | Nagano et al. | |
| 5,073,695 A * | 12/1991 | Gilliland | B23K 9/1087 219/130.31 |
| 5,359,180 A | 10/1994 | Park et al. | |
| 5,428,523 A * | 6/1995 | McDonnal | H02J 1/10 307/58 |
| 5,499,186 A | 3/1996 | Carosa | |
| 5,708,576 A | 1/1998 | Jones et al. | |
| 5,929,665 A * | 7/1999 | Ichikawa | H01L 29/00 327/109 |
| 6,031,743 A * | 2/2000 | Carpenter | H02J 1/102 307/48 |
| 6,275,958 B1 * | 8/2001 | Carpenter | G01R 31/40 307/82 |
| 7,095,634 B2 * | 8/2006 | Coulibaly | H02M 3/337 363/132 |
| 7,394,209 B2 * | 7/2008 | Lin | H02M 3/3376 315/247 |
| 7,515,446 B2 * | 4/2009 | Lin | H02M 7/53871 315/307 |
| 7,577,009 B2 * | 8/2009 | Yamamoto | H02M 5/297 363/163 |
| 7,602,623 B2 | 10/2009 | Chung et al. | |
| 7,710,063 B2 * | 5/2010 | Yoshimoto | H02M 7/483 318/800 |
| 7,813,152 B2 * | 10/2010 | Noda | H02M 7/5387 363/132 |

* cited by examiner

*Primary Examiner* — Adolf Berhane
(74) *Attorney, Agent, or Firm* — William E. Hein

(57) ABSTRACT

A fault recovery method for multi-phase power converters enables delivery of reduced output power of as much as 66% of normal power in the event of a shorted power switch component. The need for redundant power converters in conventional multi-phase space power systems is reduced, if not eliminated. Fault recovery includes 1) detecting a shorted power switch fault; 2) providing short circuit current protection; 3) providing isolation of the shorted power switch; and 4) reconfiguring the remaining undamaged power switches.

9 Claims, 7 Drawing Sheets

←—Three-Phase Operation—→ ←—All Off—→ ←—Single-Phase Operation—→

FAULT RECOVERY FOR MULTI-PHASE POWER CONVERTERS

STATEMENT AS TO GOVERNMENT FUNDING

This invention was made with government support under contract no. NNX11CA63C Phase III dated Apr. 2, 2013, awarded by the National Aeronautics and Space Administration. The government has certain rights in the invention.

BACKGROUND AND SUMMARY OF THE INVENTION

This invention is directed generally to three-phase switching power systems that utilize half-bridge inverters and that exhibit very high reliability and redundancy. More particularly, the present invention is directed to a recovery method that facilitates dynamic reconfiguration of the Main Power Processing Unit (MPPU) to maintain it in fully functional condition at a reduced power level in the event of failure of one of the three half-bridge circuits. Failure of half-bridge circuits is typically caused by failure of a switching power device.

Three-phase power switching systems are employed in DC power generators for gridded Ion engines and Hall thrusters installed on satellites. These DC power generators must be light weight and exhibit exceptional redundancy in environments in which silicone power switches may be damaged by radiation, typically by heavy ion bombardment.

A typical satellite electric propulsion system contains at least two gridded Ion engines or Hall thruster units, each having its own DC Power Processing Unit (PPU). Each PPU is paired with an electric thruster with no redundancy other than the other PPU-thruster pair. One of the PPUs is typically operational while another is redundant and used only when the first one is no longer operational due to failure of a component.

The heaviest part of the PPU is usually the discharge power supply in Hall thrusters and the grid power supply in gridded Ion engines. The weight of a three-phase MPPU is primarily defined by the three-phase transformers as they are the heaviest components in the MPPU. These transformers could be implemented as a single three-phase transformer or as three single-phase transformers, each controlled by a half-bridge circuit, using either power MOSFETs or other power switching devices. The MPPU ceases to be operational if one of the half-bridge power switches fails. The failed half-bridge circuit must be disconnected from the satellite power bus in order to permit continued operation of the rest of the system. Typically, the required power disconnect is accomplished by fuses or fast-operating semiconductor switches. Prior art MPPUs are unable to deliver any power if a power transistor fails shorted. The damaged MPPUs may contain some functional power switches, but if any one switch fails, the entire system becomes non-functional.

A number of fault-tolerant power converter circuits are known in the prior art. Among them are U.S. Pat. No. 5,499,186 to Carossa, U.S. Pat. No. 5,708,576 to Jones et al., and U.S. Pat. No. 7,602,623 to Chung et al. This prior art is representative of circuits that employ an additional switch in parallel with each power switch in a half-bridge circuit for use in combination with its own disconnect device in order to isolate a failed power switch and maintain redundancy. These circuits are disadvantageous in that they require additional hardware to drive the redundant switch and additional disconnect and/or current sensing components.

Another prior art approach for maintaining MPPU redundancy is to implement the MPPU using multiple low power modules, connected to the load in parallel, equipped with a circuit that allows automatic disconnect of the failed power supply from the load and input bus. Representative of these circuits are those described in U.S. Pat. No. 4,150,425 to Nagano et al. and U.S. Pat. No. 5,359,180 to Park et al.

Usually, an MPPU configured as described in the preceding paragraph, requires N+1 power modules. N modules are required to meet mission requirements, and one module is redundant. This method requires additional hardware that is not normally in use. In case lower power operations are allowed, this approach implies extra weight, because each power supply requires a complete control circuit. Circuit elements that are located in the high current path decrease the overall efficiency of those power supplies even when operating at lower power levels.

It would therefore be advantageous to provide an MPPU that employs a control circuit implemented in discrete logic, a programmable logic device, or Application Specific Integrated Circuits (ASICs) to permit dynamic reconfiguration of the MPPU control system to maintain the MPPU in fully functional condition at a reduced power level, compared to its nominal power level, in the event of failure of one of the three half-bridge circuits caused by a failure of one of the switching power devices.

In accordance with the illustrated preferred embodiment of the invention, the control circuit generates pulses that are shifted 120 degrees from other 120-degree shifted pulses for the half-bridge circuits in normal operation mode, providing full power delivery. A high current spike event is detected in the half-bridge circuit if one of the power switches is damaged, for example, by heavy ion particle bombardment, and the opposite power switch is turning ON.

The present control circuit disconnects the operational power switch in the failed half-bridge circuit and reconfigures timing for the remaining two half-bridge circuits so they operate in full-bridge mode at a lower power range. The power range of the PPU circuit will be maintained at approximately 66% of nominal power.

The control circuit of the present invention maintains redundancy of the Ion Engine PPU in case of a power switch component failure. This circuit permits elimination of the prior art redundant PPU if the propulsion system permits power reduction, thereby permitting a significant reduction in weight of the propulsion system.

DETAILED DESCRIPTION OF THE PREFERRED EMBODIMENT

Figure 1:
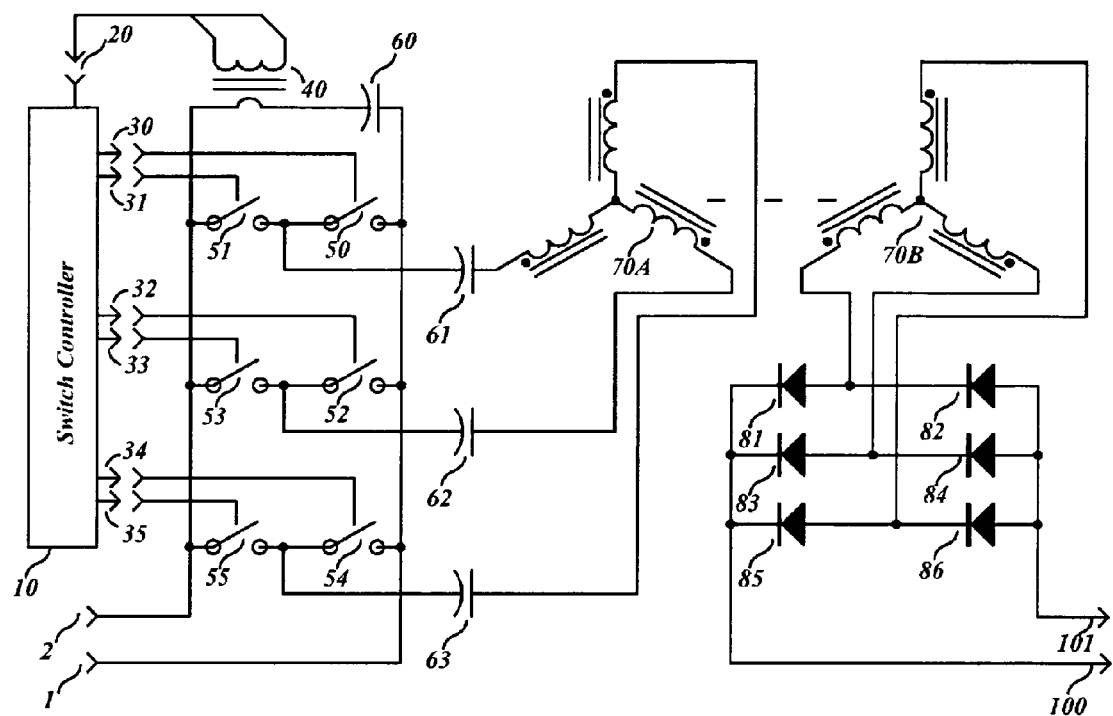
FIG. 1 illustrates a prior art three-phase resonant inverter circuit with wye-connected transformers and a fault sensing current transformer.

Referring now to FIG. 1, there is shown a three-phase resonant converter that is representative of many types of prior art three-phase resonant converters. These prior art resonant converters also include a switch fault detection circuit 40 and a switch controller 10 that together can detect and isolate shorted switch components. The switch controller 10 provides the electronic drive to switches 50-55, each pair (50-51, 52-53, 54-55) of which comprises one of the three half-bridge inverters. Each of the switching devices 50-55 includes a conventional electronic switch such as a transistor, and may also include a conventional freewheeling diode, connected in an anti-parallel manner, and a blocking diode in series with the electronic switch. The switching devices 50-55 are operated by the switch controller 10 that conventionally controls three-phase-shifted half-bridges.

Conventional DC power is applied to the three-phase resonant converter at terminals 1 and 2. Capacitor 60 provides voltage filtering for the converter's input power and provides current to the fault detector 40 during a switch fault. The switch controller 10 controls all six switches through control lines 30-35. Normally, the switches 50-55 produce three 120-degree phase-shifted square waves with voltage amplitude equal to the applied DC voltage.

The three square waves are applied to the resonant circuit through capacitors 61-63. The three-phase transformer 70A, 70B provides the needed voltage isolation, winding ratios, and resonant inductive components. The output of transformer 70A, 70B is connected to the full wave rectifier diodes 81-86. The output from the rectifier diodes 81-85 is a DC voltage that is presented at the output terminals.

CLL and LCC are popular series resonant topologies, and they have both been used in prior art three-phase resonant converters. Although a CLL type of three-phase resonant converter is shown in FIG. 1, it has been determined that the switch controller 11 of the present invention works well with an LCC three-phase resonant converter. Furthermore, any known type of multiple-phase inverter, square-wave or resonant, can benefit from the teachings of the present invention. The number of phases in the switching bridge may be increased, and may also be reduced from three to two.

Figure 2:
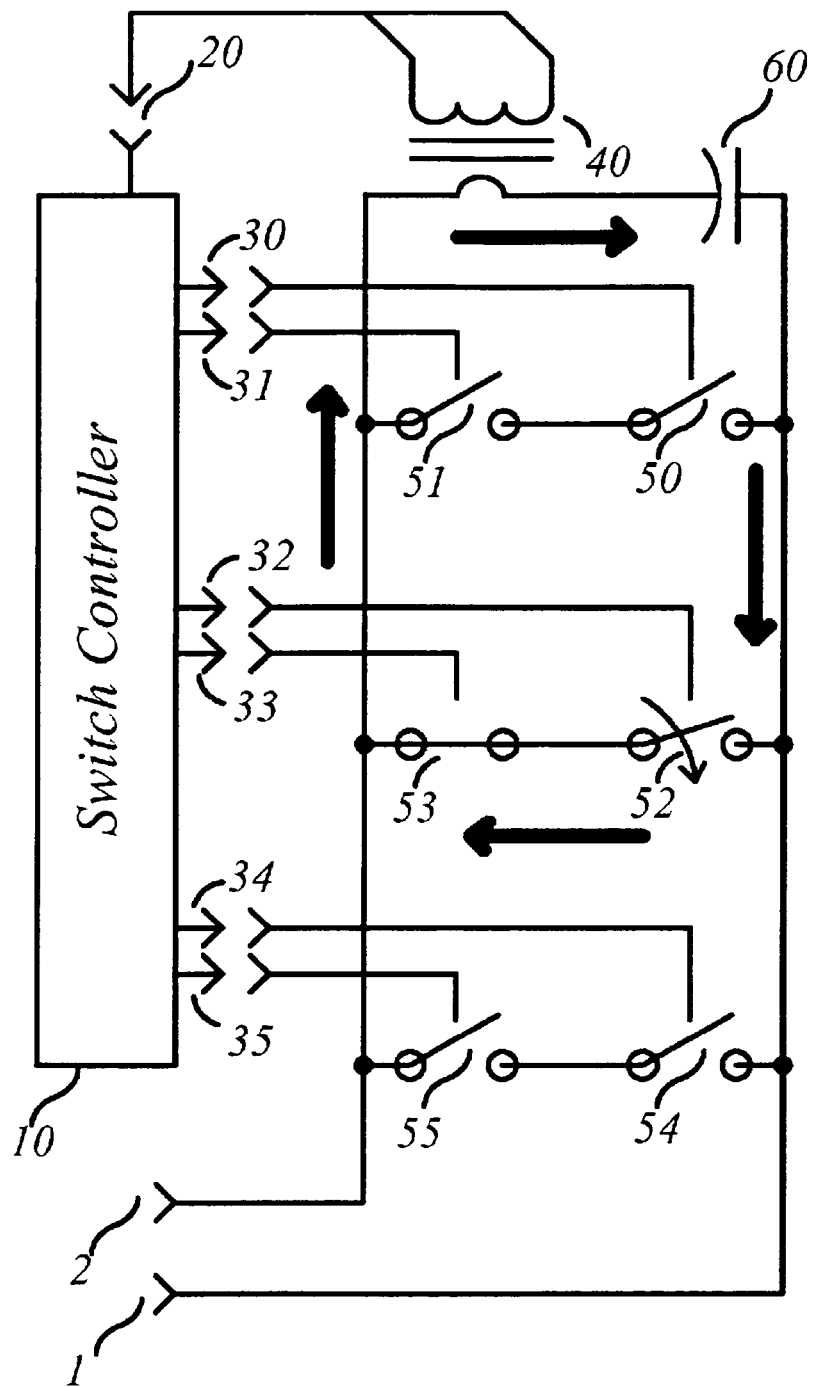
FIG. 2 illustrates the flow of cross-conduction current during a shorted switch fault in the prior art switch controller of FIG. 1.

Referring now to FIG. 2, there is shown a prior art inverter that has a damaged switch 53. The damage may have resulted from a manufacturing defect, abnormal operating conditions, or a radiation event that is referred to as a single event burnout (SEB). In any case, the damage almost always results in the switch permanently remaining in a highly conductive state. When the other switch 52 in the half-bridge begins its conduction, the current rapidly rises due to the shorted switch 53. This high current, often termed cross-conduction current, causes a current surge at the input power terminals 1 and 2 and also a current surge through the filter capacitor 60. Discharge of the filter capacitor 60 is sensed by the current transformer 40. The current transformer 40 in turn sends a signal to the switch controller 10 indicating that a switch fault has occurred. The switch controller 10 must take immediate action to limit the duration of cross-conduction. If the cross-conduction persists for more than a few hundred nanoseconds, permanent damage can occur to both of the switches in the half-bridge. If both switches in the half-bridge become shorted, the converter will be destroyed. Input fuses or circuit breakers will be the only limitation to the ensuing surge current. In prior art converters, this surge current has been known to burst the switch packaging, resulting in a spray of conductive ionized gas throughout the converter, creating extensive hardware damage.

Figure 4A:
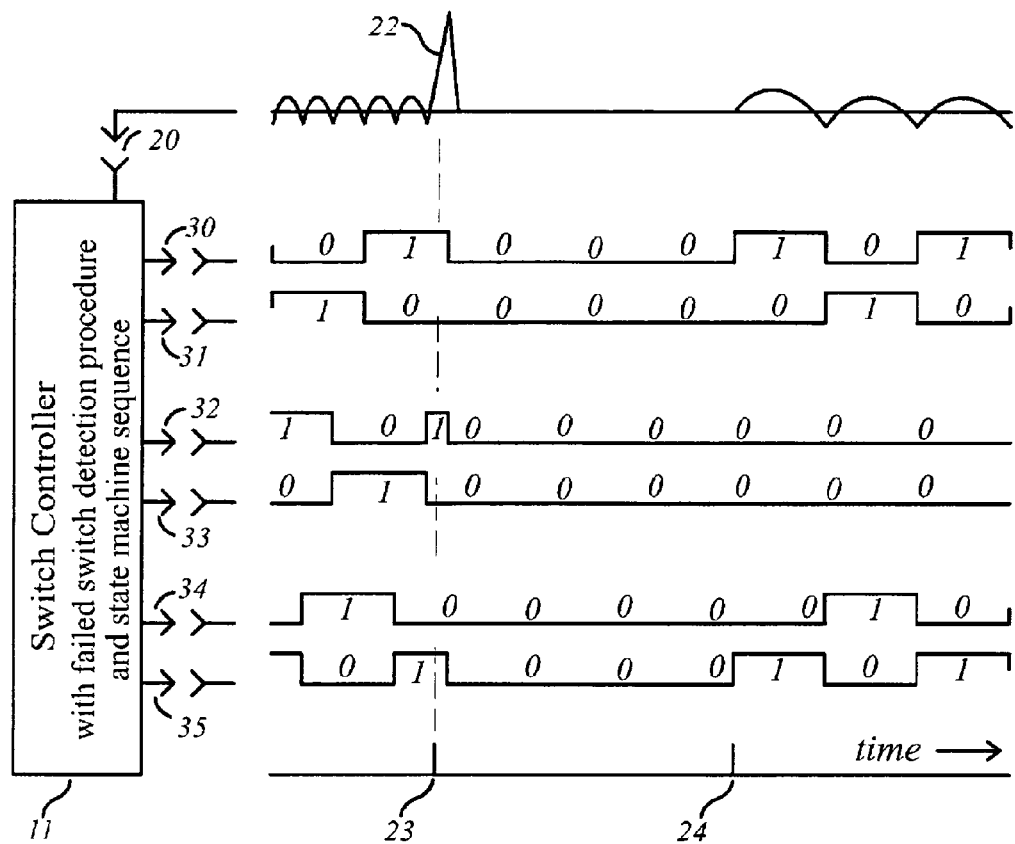
FIG. 4A illustrates the three-phase switch signals and fault detector input signals during normal conditions, during fault detection and shut down conditions, and during reduced output power fault recovery conditions.
Figure 5:
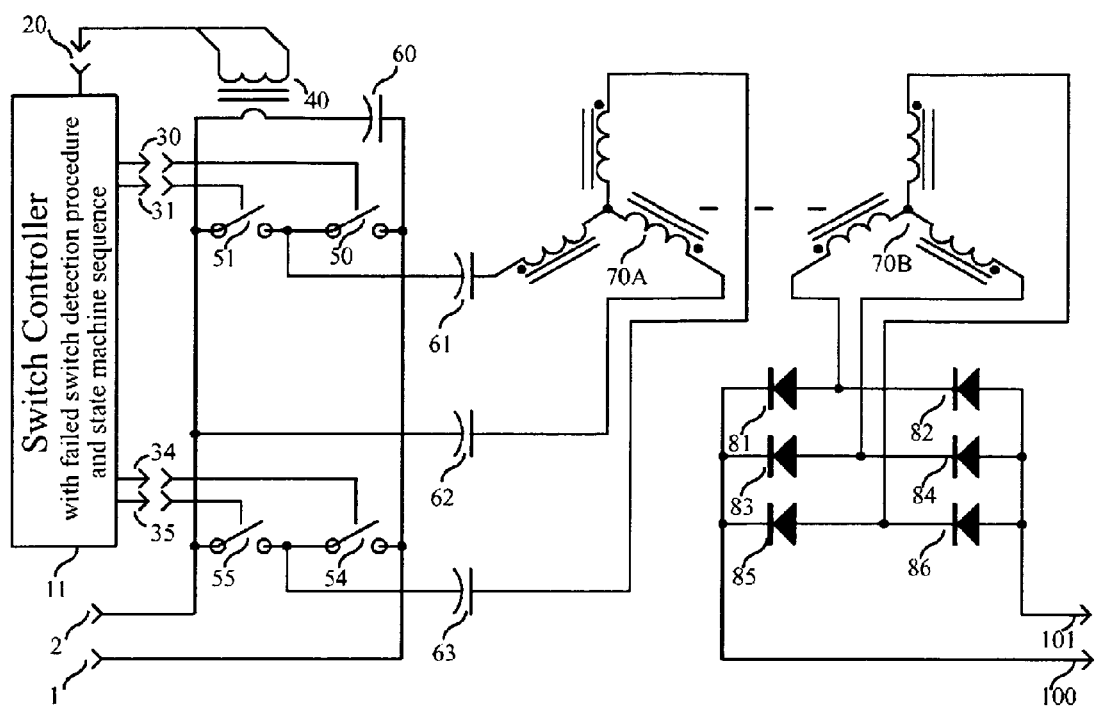
FIG. 5 illustrates a fault-stricken three-phase inverter that has been electronically reconfigured as a single-phase full-bridge converter operating at reduced output power.

The switch controller 11 of the present invention, shown in FIGS. 4A and 5, requires a fast fault detector. The current transformer 40 works well for this application. It provides isolation from high voltage and is free from many false trigger effects. High speed detectors other than the current transformer may be employed. For example, a high speed voltage detector can detect the collapse of the input voltage due to a short. A fast voltage detector could replace the current transformer as a detector.

Figure 3:
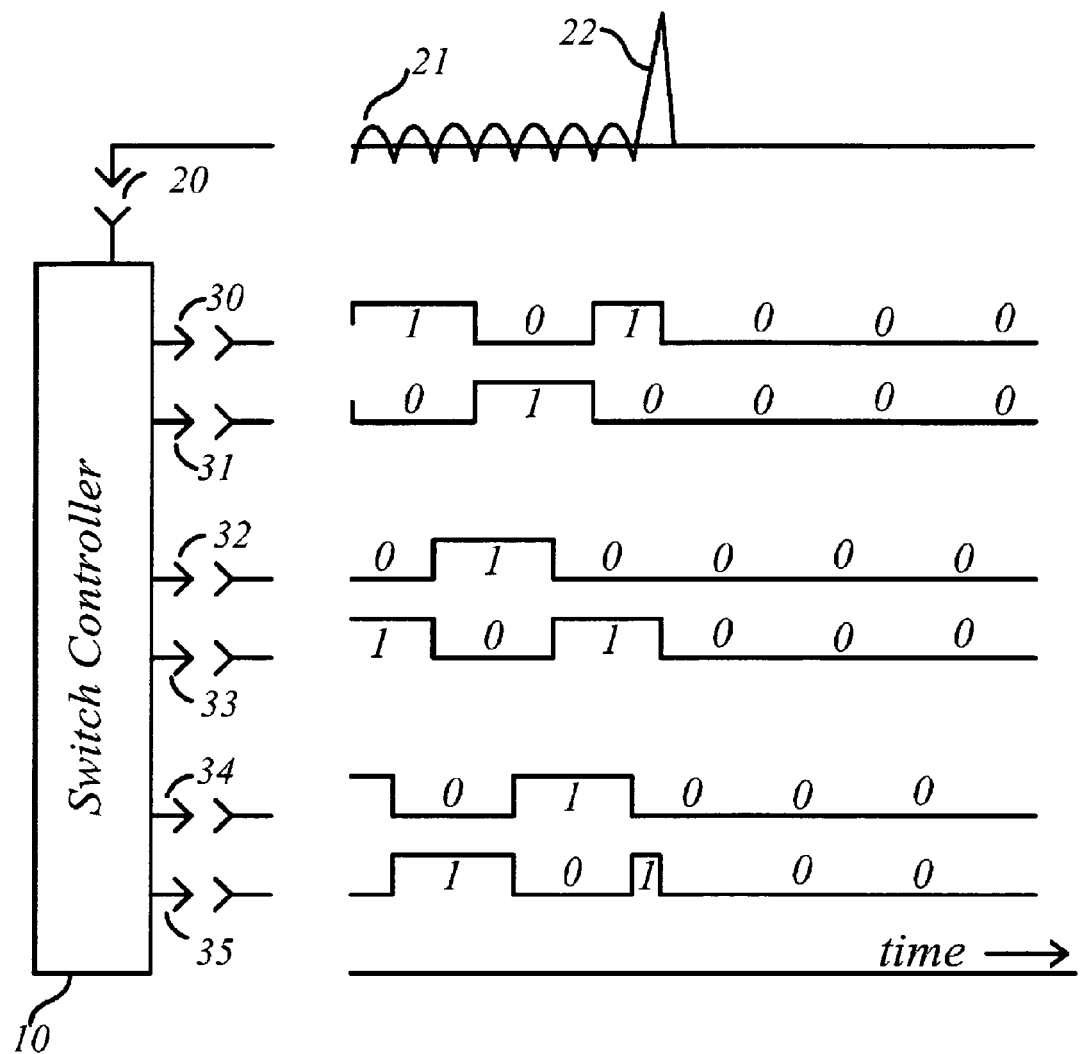
FIG. 3 illustrates prior art waveforms produced by a three-phase switch controller operating in normal mode.

Referring now to FIG. 3, there are shown the prior art signals generated by the switch controller 10 which are provided at terminals 30-35. A '0' represents an open switch, while a '1' represents a closed and conducting switch. Signals 30-31, 32-33, and 34-35 control the switches to prevent any two switches of the half-bridge from being closed at the same point in time. This is to avoid shorting the input power bus and risking damage to the switches. The duty cycle of the switches is 50% in this illustration, but it could be different. The frequency range for the three-phase converters can typically be from the tens of kilohertz region to as high as 1 MHz.

Referring now to FIGS. 2 and 3, the fault detector circuit signal line 20 is an input to the switch controller 10. The signal on line 20 is provided by current-transformer 40. The fault detector circuit signal 20 is a scaled replica of the current that flows through the filter capacitor 60. The normal circuit signal on line 20 is a low level ripple that is six times the switching frequency of the inverter. This low level signal is ignored by the circuitry of switch controller 10 because it represents normal operation.

Referring now to FIG. 4A, three-phase switch controller 11 includes state machine logic for 1) detecting a shorted switch, 2) opening all of the switches to stop cross-conduction, 3) isolating the shorted switch so as not to cause further damage, and 4) re-energizing the remaining functional half-bridges in a single-phase full-bridge converter. In the time period leading to time stamp 23, the controller 11 is functioning as a normal three-phase controller. The input line 20 to the fault detector of switch controller 11 is low with low level ripple noise. At time stamp 23, switch 52 fails during its non-conducting cycle when the voltage stress is maximum. Because switch 53 was shorted while switch 52 was conducting, a large cross-conduction current surge passes through both switches 52 and 53. Current transformer 40 begins sensing fault current at time stamp 23. The current transformer sends a signal spike to terminal 20 of the switch controller 11. The switch controller 11 senses the voltage spike and immediately issues an 'off' command to all switches, thus ending the flow of cross-conduction current.

After a brief time with all switches open, the switch controller 11 can then operate in one of two ways. Disable the suspected shorted switch and its pair or re-try the switches to determine if a permanent fault is truly present. In most cases, a retry of the switches 52, 53 is the best choice. During a retry, the current transformer 40 switch controller 11 provide protection against excessive cross-conduction current. The retry also gives the switch controller 11 better information to pinpoint the failed switch. In order to reduce weight, a single current transformer 40 was chosen as a fault detection, rather than utilizing a separate current transformer 40 in each phase. The single current detector transformer 40 has the property that any one of the six switches can activate the detector. In order to determine which of switches 52, 53 failed, the switch controller 11 must reference the time when the fault detector signal was received against which of the switches 52, 53 was turned on. A fault detected at the time of switch closure is an indication that that switch's pair has been damaged.

Time stamp 24 shows when the decision to lock out a shorted half-bridge and resume partial power delivery occurs. At this point the controller knows which half-bridge has failed by comparing the fault detector signals to the time a switch is turned on. In this case, the switch controller 11 has identified switch 52 as the failed component. The switch controller 11 then deactivates the half-bridge consisting of switches 52, 53. The other two half-bridges are now reactivated. However, instead of the 120 degrees of phase shift between the half-bridges there is now 180 degrees of phase shift due to an adjustment made by the switch controller 11.

Because there are now two functional half-bridges instead of three, the switch controller 11 limits the output power to approximately ⅔ of the nominal output power of the three-phase converter. It is important to note that the input/output ripple frequency is reduced by a factor of three due to the single phase operation.

Figure 4B:
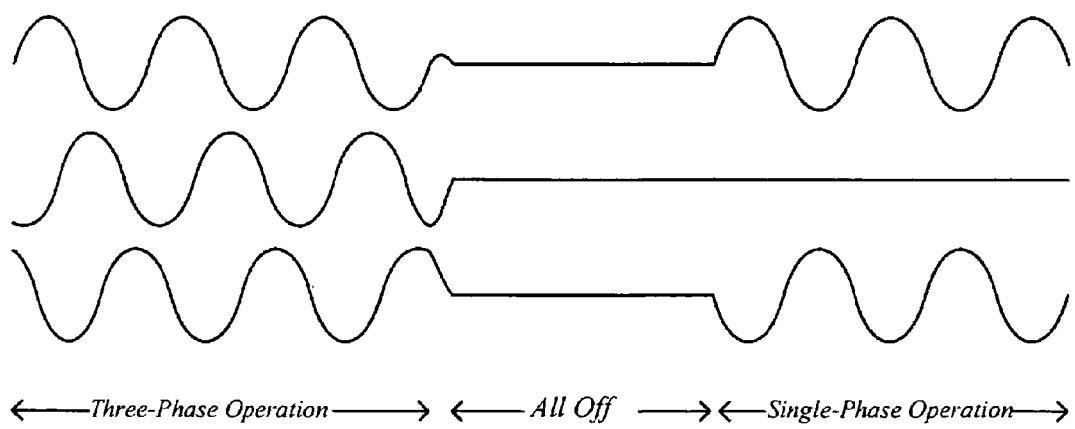
FIG. 4B illustrates the primary current waveforms of the present invention in relation to the three-phase switch signals and the fault detector input signals shown in FIG. 4A.

Referring now to FIG. 4B, there are shown waveform diagrams of the primary current applied to the three-phase transformer. The left-hand side shows normal three-phase currents, shifted in phase 120 degrees from each other. When a fault is sensed, the current flow ceases, as shown because all functioning half-bridge switches are opened. After a brief period during which all switches are off, the switches are reconfigured for single-phase operation by the switch controller 11. The right-hand side of the waveform diagram of FIG. 4B shows the current flow provided by two functioning half-bridges and one non-functioning half-bridge. The two functioning half-bridges provide identical but opposite currents.

Referring now to FIG. 5, there is shown the damaged three-phase converter re-drawn as the electrical equivalent of the reconfigured full-bridge converter. The shorted switch 53 has been replaced by a wire. Switch 52, which is held open to prevent cross-conduction, has been omitted from the illustration for the purpose of clarity.

A notable characteristic of the present invention is the low stress placed on the damaged or disabled half-bridge components. The waveform diagrams of FIG. 4B indicate that the current in the disabled primary circuit is zero or near zero. The reason for the low stress is that the full-bridge topology configuration places the disabled phase at the center of a balanced circuit. With further reference to FIG. 5, it may be seen that the primary leg coupled to capacitor 62 and to the shorted switch appears symmetrical with the remaining two half-bridges. Each half-bridge produces a signal that is equal in magnitude but opposite in polarity. At the symmetrical center point between the two half-bridges, the voltages and currents will be reduced to near zero.

Reconfiguring switch controller 11 of the present invention from three-phase to single-phase does not require a significant change in the control signals, such as duty cycle or operating frequency. In the case of an LCC or CLL based resonant design, circuit modeling has shown that the control frequency can be left unchanged in both modes of operation. There is little resulting change in the switch currents when the switch controller 11 is switched between three-phase operation and single-phase operation even when the control frequency is held constant. The demonstrated insensitivity of the switch current to the topology reconfiguration makes it possible to parallel converters with a common control frequency. In applications where many converters are needed to supply large amounts of power, it is common to parallel the outputs and frequency-lock the converters to a common control signal. In such a case it would be possible to have some converters operating in the three-phase mode and others operating in the single-phase mode. In both cases, the switch current stress will be roughly equal.

Figure 6A:
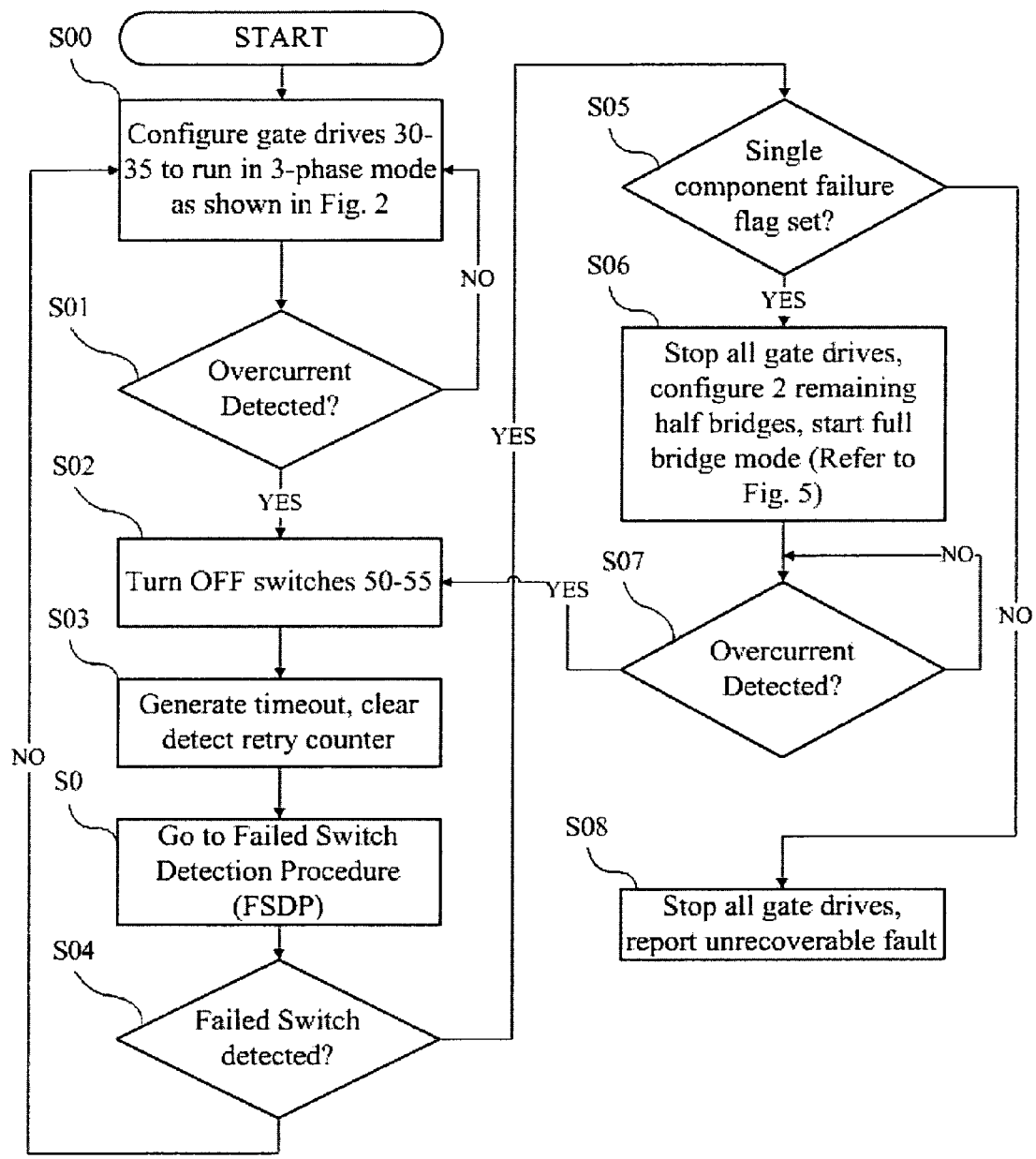
FIG. 6A illustrates operations of the state machine that runs switch controller 11 of FIG. 5.
Figure 6B:
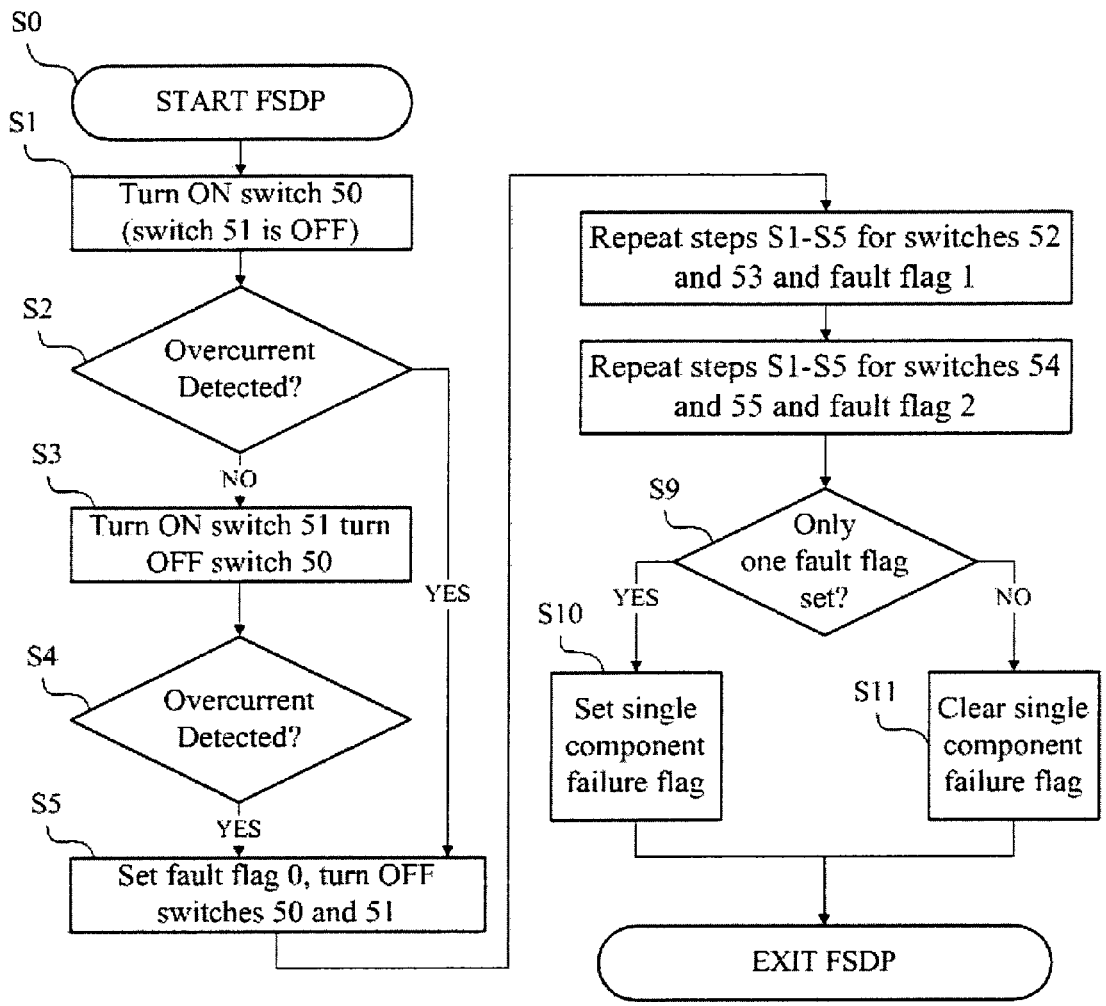
FIG. 6B illustrates possible operations of the state machine when it executes the Failed Switch Detection Procedure.

A conventional state machine within switch controller 11 is programmed to execute the step operations shown in the flow charts of FIGS. 6A and 6B. With specific reference first to FIG. 6A, at state S00 the half-bridge switches of FIG. 2 are configured to run in the three-phase mode, and generation of the gate drive control pulses 30-35 applied to switches 50-55 are enabled. At state S01, the line 20 input to current transformer 40 is continuously monitored in order to detect an overcurrent event. Operation remains in state S01 if an overcurrent event is not detected.

If an overcurrent event occurs state S02 is entered, which turns off or opens all of the half-bridge switches 50-55. State S03 is then entered, which serves to clear the overcurrent detect retry counter and to generate a timeout that allows the functional switch in the half-bridge circuit (that has, for example, been affected by an SEB event) to dissipate thermal energy that has been generated in the opposite (potentially failed) switch in the same half-bridge circuit. When the timeout has expired, operation is transferred to the Failed Switch Detection Procedure (FDSP) set forth in the flow chart of FIG. 6B. After FDSP has been completed, operation continues at state S04 at which the fault flags of half-bridge switches 50-55 are checked. Operation returns to state S01 to resume 3-phase operations if none of the fault flags is set during execution of the FSDP, and moves to state S05 if one or more of the fault flags are set.

At state S05, the number of failed half-bridge circuits resulting from the SEB are checked. Operation continues at state S06 in the event a single component failure flag is set, at which the gate drives control module is reconfigured to generate full-bridge gate drive control pulses as illustrated in FIGS. 4A and 4B in order to properly control the power topology shown in FIG. 5. The detected failed half-bridge is excluded from operations by turning off the functional switch in the failed half-bridge.

Operation continues at state S07 where overcurrent events are continuously monitored. In the event an overcurrent condition happens again, the FSDP of FIG. 6B is executed, and operation is returned to state S02. If no new fault flag is set, the FSDP will again set a single component failure flag and resume full-bridge operations.

At state S08, gate drives 30-35 will be shut down if a single component failure flag is cleared by the FSDP. Unrecoverable fault status will be reported to the system controller. Future operations are impossible.

With reference now to FIG. 6B, there are shown the FDSP logic operations executed by switch controller 11. The detection sequence is shown only for one half-bridge circuit (switches 50, 51) because the remaining two half-bridge circuits are exactly the same with the exception that they exercise other half-bridge circuits and use fault 1 and fault 2 flags to indicate the state of the corresponding circuit.

At state S1, switch 50 is turned on. If no overcurrent condition is detected at state 2, operation moves to state S3 at which switch 50 is turned OFF and switch 51 is turned ON. If overcurrent is detected at state S2, operation moves to state S5.

At state S4, another check for an overcurrent event is made. The switch controller 10 sets fault flag 0 to indicate that the half-bridge with switches 50-51 has a damaged component. Switches 52, 53 and 54, 55 are repeatedly exercised using the same states as shown for switches 50, 51, indicating faulted components by means of fault flags 1 and 2, respectively.

Operation continues at state S9 once detection queries for all switches have been completed. State S9 checks how many fault flags are set. Operation continues at state S11 if only one fault flag is set and moves to state S11 if more than one fault flag is set. A single component failure flag is set at state S10 to indicate that full-bridge operations are possible if only one fault flag is set.

We claim:

1. A method for providing partial power delivery from a damaged multi-phase power converter powering a DC load, the method comprising:
   detecting that one of a plurality of transistor switches provided within the multi-phase power converter has become shorted while the multi-phase power converter is energized;
   opening other ones of the plurality of transistor switches that remain undamaged, to prevent short-circuit current damage to the multi-phase power converter;
   electrically identifying the transistor switch previously detected as having become shorted;
   electrically isolating the shorted transistor switch; and
   electrically selectively reconfiguring the opened undamaged transistor switches to permit reapplication of power to the DC load.

2. A method as in claim 1, further comprising providing a single fault detector within the multi-phase power converter for use in electrically detecting and identifying the shorted transistor switch from among the plurality of transistor switches.

3. A method as in claim 2, wherein a signal provided by the fault detector is timed to be chronologically correlated in a state machine provided within the multi-phase power converter to a concurrent switch closing command issued by switch controller logic provided within the multi-phase power converter.

4. A method as in claim 1, wherein each phase of the multi-phase power converter comprises a half-bridge transistor topology and in which an undamaged transistor of a half-bridge containing the shorted transistor is held open to electrically isolate the shorted transistor.

5. A method as in claim 1, wherein detecting that one of a plurality of transistor switches provided within the multi-phase power converter has become shorted comprises a predetermined number of detection tests to eliminate a false fault detection.

6. A method for providing partial power delivery from a damaged three-phase power converter powering a DC load, the method comprising:
   detecting that one of a plurality of transistor switches provided within the three-phase power converter has become shorted while the three-phase power converter is energized;
   opening other ones of the plurality of transistor switches that remain undamaged, to prevent short-circuit current damage to the three-phase power converter;
   electrically identifying the transistor switch previously detected as having become shorted;
   electrically isolating the shorted transistor switch; and
   electrically selectively reconfiguring the opened undamaged transistor switches to form a single-phase full-bridge converter to permit reapplication of power to the DC load.

7. A method as in claim 6 wherein the opened undamaged transistor switches are selectively electrically reconfigured to permit reapplication of two-thirds of an original power rating to the DC load.

8. A method as in claim 7 wherein the three-phase power converter comprises a series resonant converter topology with frequency control for precise regulation of output power.

9. A method as in claim 8 wherein the damaged three-phase power converter is operating with at least one other three-phase power converter, wherein output powers from the damaged and undamaged three-phase power converters are combined at a common output connection, and wherein the damaged three-phase power converter shares common control frequency signals with one or more undamaged three-phase power converters.

* * * * *